3,629,275
CARBOXYLIC ACID (1,2,4-THIADIAZOL-5-YL)-
AMIDES
Carl Metzger and Dieter Borrmann, Wuppertal-Elberfeld, Richard Wegler, Leverkusen, Ludwig Eue, Cologne-Stammheim, and Helmuth Hack, Cologne-Buchheim, Germany, assignors to Farbenfabriken Bayer Aktiengesellschaft, Leverkusen, Germany
No Drawing. Filed Aug. 29, 1968, Ser. No. 756,310
U.S. Cl. 260—306.8                                     4 Claims

ABSTRACT OF THE DISCLOSURE

[(Alkyl, haloalkyl, alkoxy and phenoxy)-carbonyl]-N-(3-alkyl and phenyl-1,2,4-thiadiazol-5-yl)-amides, i.e. (alkanoyl, haloalkanoyl, carboalkoxy and carbophenoxy)-N-(3-alkyl and phenyl-1,2,4-thiadiazol-5-yl)-amides or (alkanoic, haloalkanoic, monoalkyl carbonic and monophenyl carbonic acid)-N-(3-alkyl and phenyl-1,2,4-thiadiazol-5-yl)-amides, which possess herbicidal properties, and which may be produced by conventional methods.

The present invention relates to and has for its objects the provision for particular new carboxylic acid (1,2,4-thiadiazol-5-yl)-amides, i.e. [(alkyl, haloalkyl, alkoxy and phenoxy)-carbonyl]-N-(3-alkyl and phenyl-1,2,4-thiadiazol-5-yl)-amides, or (alkanoyl, haloalkanoyl, carboalkoxy and carbophenoxy)-N-(3-alkyl and phenyl-1,2,4-thiadiazol-5-yl)-amides, or (alkanoic, haloalkanoic, monoalkyl carbonic and monophenyl carbonic acid)-N-(3-alkyl and phenyl-1,2,4-thiadiazol-5-yl)-amides, which possess valuable, especially selective, herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is known that carboxylic acid amides, such as propionic acid 3,4-dichloroanilide (A) [see German Auslegeschrift 1,039,779]; carbamates, such as isopropyl-N-(3-chlorophenyl)-carbamate (B) [see U.S. Pat. 2,734,911]; and thiazolylureas, such as N-(4-methyl-1,3-thiazol-2-yl)-N'-methyl-urea (C) [see Belgian Pat. 679,138] can be used as herbicides.

It has now been found, in accordance with the present invention, that the particular new carboxylic acid (1,2,4-thiadiazol-5-yl)-amides having the general formula

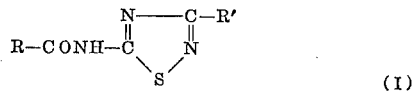

(I)

in which

R is selected from the group consisting of alkyl having 1–4 carbon atoms, haloalkyl having 1–4 carbon atoms, alkoxy having 1–4 carbon atoms and phenoxy, and
R' is selected from the group consisting of alkyl having 1–4 carbon atoms and phenyl, exhibit strong herbicidal, in particular selective herbicidal, properties.

Analogous 1,2,4-thiadiazol-5-yl ureas having particularly effective, especially selective, herbicidal activity, are disclosed and claimed in copending U.S. application Ser. No. 756,296, filed simultaneously herewith (corresponding to German application No. F 53,530 IVd/12p), whereas analogous N-substituted 5-amino-1,3,4-thiadiazoles having particularly effective, especially selective, herbicidal activity, are disclosed and claimed in copending U.S. application Ser. No. 756,284, also filed simultaneously herewith (corresponding to German application No. 53,531 IVd/12p).

The present invention also provides a process for the production of carboxylic acid amides of the Formula I above in which (a) a carboxylic acid halide of the formula R—CO—Hal          (IIa)

in which

R is the same as defined above, and
Hal is halogen, especially chloro, is reacted, in the presence of an acid binder, with a 5-amino-1,2,4-thiadiazol of the formula

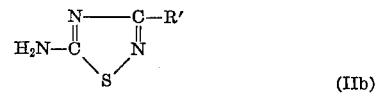

(IIb)

in which R' is the same as defined above, or (b) an acid anhydride of the formula

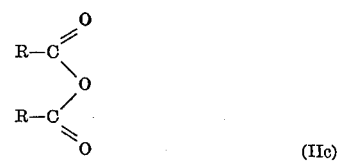

(IIc)

in which R is the same as defined above, is reacted with a 5-amino-1,2,4-thiadiazole of Formula IIb above.

It is most surprising that the carboxylic acid-(1,2,4-thiadiazol-5-yl)-amides according to the present invention exhibit a stronger herbicidal potency and, in particular, a higher selective herbicidal activity, than the already known compounds.

If monochloroacetyl chloride and 3-phenyl-5-amino-1,2,4-thiadiazole are used as starting materials, the reaction according to process variant (a) can be represented by the following reaction scheme:

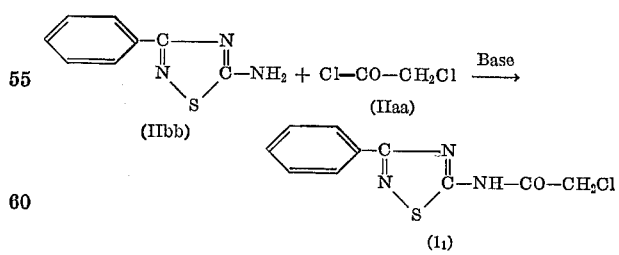

When n-propionic anhydride and 3-propyl-5-amino-1,2,4-thiadiazole are used as starting materials, the reaction according to process variant (b) can be represented by the following reaction scheme:

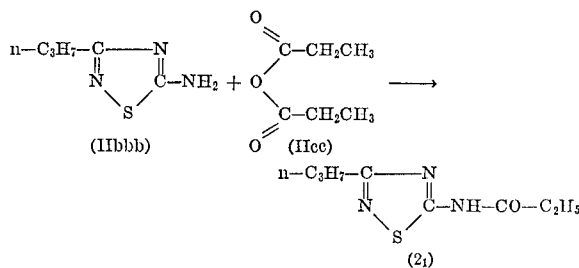

Advantageously, in accordance with the present invention, in the various formulae herein:

R represents

Alkyl having 1–4 carbon atoms, such as methyl, ethyl, n- and iso- propyl, n-, iso-, sec.- and tert.- butyl, and the like, especially $C_{1-2}$ alkyl, and particularly ethyl; or Haloalkyl having 1–4 carbon atoms, such as chloro, bromo, fluoro and/or iodo substiuted methyl to tert.-butyl inclusive, and the like, as defined above, especially 1–4 halo, more especially 1–4 chloro, fluoro and/or bromo, substituted $C_{1-4}$, especially $C_{1-2}$, alkyl, particularly 1–4 chloro substituted $C_{1-4}$, especaily $C_{1-2}$, alkyl, preferably 1–2 chloro substituted $C_{1-4}$, especially $C_{1-2}$, alkyl, most especially mono and dichloro methyl; or Alkoxy having 1–4 carbon atoms such as methoxy, ethoxy, n-and iso-propoxy, n-, iso-, sec.- and tert.-butoxy, and the like especially $C_{1-2}$ alkoxy, and particularly methoxy; or Phenoxy; and R' represents Alkyl having 1–4 carbon atoms such as methyl to tert.-butyl inclusive, and the like, as defined above, especially $C_{1-3}$ alkyl, and particularly n-propyl; or Phenyl.

In accordance with a particular feature of the present invention, R represents $C_{1-4}$, especially $C_{1-2}$, alkyl, or halo $C_{1-4}$, especially 1–2 chloro substituted $C_{1-2}$, alkyl; and R' represents $C_{1-4}$, especially $C_{1-3}$, alkyl, or phenyl.

The carboxylic acid halides and anhydrides to be used according to the present invention are defined by the Formulae IIa and IIc above, and are known.

As examples of the carboxylic acid halides which can be used according to the process of the present invention, there may be mentioned: monochloroacetyl chloride, dichloroacetyl chloride, 3-chloropropionyl chloride, propionyl chloride, the methyl ester of chloroformic acid, and the like. As carboxylic acid anhydride, propionic anhydride is particularly suitable.

The 5-amino-1,2,4-thiadiazoles used as starting materials are clearly characterized by the Formula IIb above.

Some of these aminothiadiazoles are known. Those which are not yet known are prepared in the same manner as the known aminothiadiazoles.

Below are given further details for the two process variants (a) and (b).

The reaction may take place optionally in the presence of a solvent (this term includes mere diluents).

As solvents, inert organic solvents are especially suitable. These include hydrocarbons, such as benzene, toluene; ethers, such as diethyl ether, tetrahydrofuran, dioxan; esters, such as methyl acetate or ethyl acetate; and nitriles, such as acetonitrile; and the like. In process variant (b), an excess of the anhydride is preefrably used as solvent.

As acid binders, all the usual acid-binding agents can be used. Alkali metal hydroxides, alkali metal carbonates and tertiary amines are preferred. Especially suitable are triethyl amine and pyridine.

The reaction temperatures can be varied within a fairly wide range. In general, the work is carried out at substantially between about 20–120° C., preferably between about 20–100° C.

When carrying out the process according to the present invention, approximately 1 mol of acid chloride or 1–2 mols of acid anhydride are used to 1 mol of the aminothiadiazole. The working up of the reaction mixture may take place in the usual manner.

Advantageously, the active compounds according to the present invention influence plant growth and can, therefore, be used for defoliation or for desiccation of the green parts of plants. In this case they may serve as harvest auxiliaries to facilitate harvesting. They are, however, particularly suitable for the control of weeds. By weeds is meant in the widest sense all plants which grow in places where they are not desired. Whether the active compounds according to the present invention act as total or selective herbicides depends essentially on the amount applied, as the artisan will appreciate.

The active compounds according to the present invention can be used, for example, in the case of the following plants: dicotyledons, such as mustard (Sinapis), cress (Lepidium), cleavers (Galium), common chickweed (Stellaria), mayweed (Matricaria), small-flower Galinsoga (Galinsoga), fathen (Chenopodium), stinging nettle (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar cane (Saccharum); and the like.

The active compounds according to the instant invention can be utilized, if desired, in the form of the usual formulations or compositions with conventional pesticide diluents or extenders, i.e., dispersible carrier vehicles, such as solutions, emulsions, suspensions, emulsifiable concentrate, spray powders, pastes, soluble powders, dusting agents, granules, etc. These are prepared in known manner, for instance by extending the active compounds with dispersible liquid diluent carriers and/or dispersible solid carriers optionally with the use of carrier vehicle assistants, e.g. surface-active agents, including emulsifying agents and/or dispersing agents, whereby, for example, in the case where water is used as diluent, organic solvents may be added as auxiliary solvents. The following may be chiefly considered for use as carrier vehicles for this purpose: dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), ethers, ether-alcohols (e.g. glycol monomethyl ether, etc.), amines (e.g. ethanolamine, etc.), amides (e.g. dimethyl formamide, etc.), sulfoxides (e.g. dimethyl sulfoxide, etc.), ketones (e.g. acetone, etc.), and/or water; as well as dispersible finely divided solid carriers, such as ground natural minerals (e.g. kaolins, alumina, silica, chalk, i.e. calcium carbonate, talc, kieselguhr, etc.), and ground synthetic minerals (e.g. highly dispersed silicic acid, silicates, e.g. alkali silicates, etc.); whereas the following may be chiefly considered for use as carrier vehicle assistants, e.g. surface-active agents, for this purpose: emulsifying agents, such as nonionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.1–5% by weight of the mixture. Thus, the present invention contemplates over-all compositions which comprise mixtures of a dispersible carrier vehicle such as (1) a dispersible carrier solid, and/or (2) a dispersible carrier liquid such as an inert organic solvent and/or water, preferably including a surface-active effective amount of a conventional pesticide carrier vehicle assistant, e.g. a surface-active agent, such as an emulsifying agent and/or a dispersing agent, and an amount of the active compound which is effective for the purpose in question and which is generally between about 0.1–95% by weight of the mixture.

While the active compounds can be used according to the pre-emergence method, they are also effective when used according to the post-emergence method, i.e. both before and after the emergence of the plants.

In general, the amounts of the active compound actually applied, preferably according to the pre-emergence method, are substantially between about 1–50 kg./hectare, apart from any carrier vehicle which may also be present, whereas concentrations of substantially between about 0.1–5% by weight of the active compound in carrier vehicle compositions are applied in particular where formulations are used, preferably according to the post-emergence method.

The active compounds can also be used in accordance with the well-known ultra-low-volume process with good success, i.e. by applying such compound if normally a liquid, or by applying a liquid composition containing the same, via very effective atomizing equipment in extremely finely divided form, i.e. mist form, for example by airplane crop spraying techniques. Only a few liters/hectare are needed, and often amounts up to about 1 quart/acre, preferably 2–16 fluid ounces/acre, are sufficient. In this process it is possible to use highly concentrated liquid compositions with said liquid carrier vehicles containing from about 40 to about 95% by weight of active compound or even the 100% active substance alone, e.g. about 40–100% by weight of the active compound.

Furthermore, the present invention contemplates methods of selectively controlling or combating undesired plants, e.g. weeds and the like, and/or of defoliating plants, which comprise applying to at least one of (a) such weeds, plants, etc., and (b) their habitata, i.e. the locus to be protected, a herbicidally effective, or defoliating, amount of the particular active compound of the invention alone or together with a carrier vehicle as noted above. The instant formulations or compositions are applied in the usual manner, for example, by spraying, atomizing, scattering, dusting, watering, sprinkling, and the like, whether for pre-emergence application to the soil or post-emergence application to the weeds.

It will be realized, of course, that in connection with the pre-emergence use of the instant compounds as well as the post-emergence use thereof, the concentration of the particular active compound utilized in admixture with the carrier vehicle will depend upon the intended application and may be varied within a fairly wide range depending upon the weather conditions, the purpose for which the active compound is used, e.g. selective or total herbicide, and the plants which are to be controlled or protected. Therefore, in special cases, it is possible to go above or below the aforementioned concentration ranges and amounts/hectare.

The following examples illustrate, without limitation, the herbicidal activity of the particular active compounds of the present invention.

EXAMPLE 1

Pre-emergence test

Solvent: 5 parts by weight acetone
Emulsifier: 1 part by weight alkylaryl polyglycol ether.

To produce a suitable preparation of the particular active compound, 1 part by weight of such active compound is mixed with the stated amount of solvent, the stated amount of emulsifier is then added and the resulting concentrate is diluted with water to the desired final concentration.

Seeds of the test plants are sown in normal soil and, after 24 hours, watered with the given active compound preparation. It is expedient to keep constant the amount of water per unit area. The concentration of the active compound in the preparation is of no importance, only the amount of active compound applied per unit area being decisive. After three weeks, the degree of damage to the test plants is determined and characterized by the values 0–5, which have the following meaning:

0—no effect
1—slight damage or delay in growth
2—marked damage or inhibition of growth
3—heavy damage and only deficient development or only 50% emerged
4—plants partially destroyed after germination or only 25% emerged
5—plants completely dead or not emerged.

The particular active compounds tested, the amounts applied and the results obtained can be seen from the following Table 1:

TABLE 1.—PRE-EMERGENCE TEST

| Active compound | Concentration of active compound in kg./hectare | Chenopodium | Sinapis | Oats | Cotton | Wheat |
| --- | --- | --- | --- | --- | --- | --- |
| (B) Cl–C₆H₄–NH–C(=O)–O–CH(CH₃)₂ (known) | 40 | 5 | 5 | 5 | 3 | 5 |
| | 20 | 4 | 5 | 5 | 2 | 5 |
| | 10 | 4 | 4–5 | 4–5 | 1–2 | 5 |
| | 5 | 3 | 4 | 4 | 1 | 4–5 |
| (A) Cl₂C₆H₃–NH–C(=O)–CH₂–CH₃ (known) | 40 | 3 | 5 | 4 | 2 | 3 |
| | 20 | 1 | 4 | 2 | 0 | 1 |
| | 10 | 0 | 2 | 1 | 0 | 0 |
| | 5 | 0 | 0 | 0 | 0 | 0 |

TABLE 1—Continued

| Active compound | Concentration of active compound in kg./hectare | Cheno- podium | Sinapis | Oats | Cotton | Wheat |
|---|---|---|---|---|---|---|
| (C) $CH_3-C(=CH-S)-N=C-NH-C(=O)-NH-CH_3$ (known) | 40 | 5 | 5 | 4 | 4 | 4-5 |
| | 20 | 5 | 5 | 4 | 4 | 4 |
| | 10 | 5 | 4 | 3-4 | 3 | 4 |
| | 5 | 4 | 2-3 | 3 | 1 | 3 |
| (3₁) $C_6H_5-C=N, N=C-NH-CO-C_2H_5, S$ | 40 | 5 | 5 | 1-2 | 1 | 1 |
| | 20 | 5 | 5 | 1 | 0 | 0 |
| | 10 | 5 | 5 | 0 | 0 | 0 |
| | 5 | 5 | 5 | 0 | 0 | 0 |
| (2₂) $n-C_3H_7-C=N, N=C-NH-CO-C_2H_5, S$ | 40 | 5 | 5 | 5 | 5 | 3 |
| | 20 | 5 | 5 | 5 | 3 | 2 |
| | 10 | 5 | 5 | 3 | 2 | 1 |
| | 5 | 5 | 5 | 2 | 0 | 0 |

EXAMPLE 2

Post-emergence test

Solvent: 5 parts by weight acetone
Emulsifier: 1 part by weight alkylaryl polyglycol ether.

To produce a suitable preparation of the particular active compound, 1 part by weight of such active compound is mixed with the stated amount of solvent, the stated amount of emulsifier is then added and the resulting concentrate is diluted with water to the desired final concentration.

Test plants which have a height of about 5–15 cm. are sprayed with the given active compound preparation until to the plants is determined and characterized by the just dew moist. After three weeks, the degree of damage values 0–5, which have the following meaning:

0—no effect
1—a few slightly burnt spots
2—marked damage to leaves
3—some leaves and parts of stalks partially dead
4—plant partially destroyed
5—plant completely dead.

The particular active compounds tested, their concentrations and the results obtained can be seen from the following Table 2:

EXAMPLE 3 (REACTION [a])

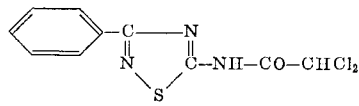

(4₂)

To 17.7 g. (0.1 mol) 3-phenyl-5-amino-1,2,4-thiadiazole in 200 ml. ether are added 10.1 g. (0.1 mol) triethyl amine; 14.7 g. (0.1 mol) dichloroacetyl chloride are then slowly added dropwise at 20° C. Stirring is continued for 30 minutes, suction filtration from the precipitated triethylamine hydrochloride is effected, the filtrate is evaporated and the residue is recrystallized from methanol. The dichloroacetic acid N-(3-phenyl-1,2,4-thiadiazol-5-yl)-amide melts at 163° C.

EXAMPLE 4 (REACTION [a])

The thiadiazoles of Formula I above which are indicated in Table 3 below are also prepared in a manner analogous to that of Example 3.

TABLE 2.—POST-EMERGENCE TEST

| Active compound | Concentration of active compound, in percent | Echino- chloa | Cheno- podium | Sinapis | Daucus | Oats | Cotton | Wheat |
|---|---|---|---|---|---|---|---|---|
| (B) $C_6H_4(Cl)-NH-C(=O)-O-CH(CH_3)_2$ (Known) | 0.2 | 3 | 3 | 4-5 | 2 | 3 | 2 | 3 |
| | 0.1 | 3 | 3 | 4 | 1 | 3 | 1 | 3 |
| | 0.05 | 2 | 2 | 3 | 0 | 2 | 1 | 1 |
| | 0.025 | 2 | 2 | 2 | 0 | 1 | 1 | 1 |
| (C) $CH_3-C(=CH-S)-N=C-NH-C(=O)-NH-CH_3$ (Known) | 0.2 | 5 | 5 | 5 | 5 | 2 | 3 | 2 |
| | 0.1 | 4 | 5 | 5 | 3 | 1-2 | 2-3 | 1-2 |
| | 0.05 | 3 | 4-5 | 4-5 | 1 | 1 | 2 | 1 |
| | 0.025 | 1 | 3 | 4 | 0 | 0 | 0 | 0 |
| (3₂) $C_6H_5-C=N, N=C-NH-CO-C_2H_5, S$ | 0.2 | 5 | 5 | 5 | 5 | 3-4 | 1 | 2 |
| | 0.1 | 4 | 5 | 5 | 5 | 3 | 1 | 2 |
| | 0.05 | 4 | 5 | 5 | 5 | 0 | 0 | 1 |
| | 0.025 | 2 | 3-4 | 5 | 3-4 | 0 | 0 | 0 |
| (4₁) $C_6H_5-C=N, N=C-NH-CO-CHCl_2, S$ | 0.2 | 4-5 | 5 | 5 | ----- | 4-5 | 1 | 2 |
| | 0.1 | 3 | 5 | 5 | 5 | 2 | 1 | 2 |
| | 0.05 | 3 | 4 | 5 | 2 | 1 | 1 | 2 |
| | 0.025 | 1 | 3 | 5 | 2 | 1 | 1 | 1 |
| (2₃) $n-C_3H_7-C=N, N=C-NH-CO-C_2H_5, S$ | 0.2 | 5 | 5 | 5 | 5 | 5 | 4-5 | 3 |
| | 0.1 | 5 | 5 | 5 | 5 | 2 | 4-5 | 1 |
| | 0.05 | 4-5 | 5 | 5 | 5 | 0 | 4 | 0 |
| | 0.025 | 3 | 4 | 4 | 3 | 0 | 3 | 0 |

TABLE 3

| | R | R' | M.P., °C. |
|---|---|---|---|
| (1₂) | $CH_2Cl-$ | $C_6H_5-$ | 209 |
| (3₁) | $C_2H_5-$ | $C_6H_5-$ | 177 |
| (2₁) | $C_2H_5-$ | $n-C_3H_7-$ | 96 |
| (5₁) | $C_2H_5-$ | $iso-C_3H_7-$ | 94 |
| (6₁) | $C_2H_5-$ | $C_2H_5-$ | 123 |
| (7₁) | $CH_3O-$ | $C_6H_5-$ | 198 |
| (8₁) | $CH_2Cl-$ | $CH_3-$ | 130 |
| (9₁) | $CH_2Cl-$ | $C_2H_5-$ | 118 |
| (10₁) | $CH_2Cl-$ | $n-C_3H_7-$ | 101 |
| (11₁) | $CH_2Cl-$ | $iso-C_3H_7-$ | 99 |
| (12₁) | $C_6H_5O-$ | $C_6H_5-$ | 207 |

It will be realized by the artisan that all of the foregoing compounds contemplated by the present invention possess the desired selective or total herbicidal properties, and especially the capability of selectively destroying weeds or defoliating plants, as well as a comparatively low toxicity toward warm-blooded creatures and a concomitantly low phytotoxicity at appropriate dosages with respect to higher plants, enabling such compounds to be used with correspondingly favorable compatibility with warm-blooded creatures and higher plants for more effective control and/or elimination of weeds by selective application of such compounds to such weeds and/or their habitat. Nevertheless, the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Carboxylic acid (1,2,4-thiadiazol-5-yl)-amide having the formula

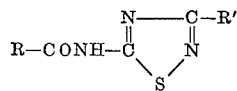

wherein R is haloalkyl having 1–4 carbon atoms, and R' is selected from the group consisting of alkyl having 1–4 carbon atoms and phenyl.

2. Amide according to claim 1 wherein R is 1–2 chloro substituted $C_{1-2}$ alkyl, and R' is selected from the group consisting of $C_{1-3}$ alkyl and phenyl.

3. Amide according to claim 2 wherein such compound is chloroacetic acid N-(3-phenyl-1,2,4-thiadiazol-5-yl)-amide having the formula

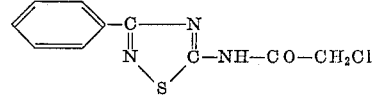

4. Amide according to claim 2 wherein such compound is dichloroacetic acid N-(3-phenyl-1,2,4-thiadiazol-5-yl)-amide having the formula

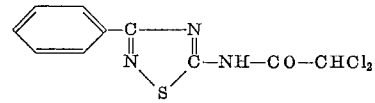

References Cited

Goerdeler et al.: Chem. Abstracts, 49:6239–40 (1954).
Goerdeler et al.: Chem. Abstracts, 60:6836–8 (1964).
Shoeb et al.: Chem. Abstracts, 38:7532–3 (1963).

ALEX MAZEL, Primary Examiner

R. J. GALLAGHER, Assistant Examiner

U.S. Cl. X.R.

71—90

UNITED STATES PATENT OFFICE
CERTIFICATE OF CORRECTION

Patent No. 3,629,275                           Dated December 21, 1971

Inventor(s)   Carl Metzger et al.

It is certified that error appears in the above-identified patent and that said Letters Patent are hereby corrected as shown below:

Column 7, lines 35 and 36, should read -- just dew moist. After three weeks, the degree of damage to the plants is determined and characterized by the --.

Signed and sealed this 5th day of December 1972.

(SEAL)
Attest:

EDWARD M. FLETCHER, JR.            ROBERT GOTRSCHALK
Attesting Officer                  Commissioner of Patents

UNITED STATES PATENT OFFICE
CERTIFICATE OF CORRECTION

Patent No. 3,629,275                      Dated December 21, 1971

Inventor(s) Carl Metzger et al.

It is certified that error appears in the above-identified patent and that said Letters Patent are hereby corrected as shown below:

In the heading to the printed specification, insert

-- Claims priority, application Germany Sept. 19, 1967

F 53532 IVd/12 p. --.

Signed and sealed this 15th day of October 1974.

(SEAL)
Attest:

McCOY M. GIBSON JR.                    C. MARSHALL DANN
Attesting Officer                      Commissioner of Patents